J. SHACKLETON & J. P. BINNS
Machine for Tying in Warps.

No. 209,927. Patented Nov. 12, 1878.

Fig. 1.

Witnesses:
G. W. Gregory
L. H. Latimer

Inventor:
James Shackleton and Joseph P. Binns
per H. K. P. Joy, Atty's.

J. SHACKLETON & J. P. BINNS
Machine for Tying in Warps.
No. 209,927. Fig. 2. Patented Nov. 12, 1878.

J. SHACKLETON & J. P. BINNS
Machine for Tying in Warps.

No. 209,927. Patented Nov. 12, 1878.

Fig.4.

Witnesses.
G. W. Gregory
C. H. Latimer

Inventor.
James Shackleton and Joseph J. Binns
per A. K. P. Joy attys.

J. SHACKLETON & J. P. BINNS
Machine for Tying in Warps.

No. 209,927. Patented Nov. 12, 1878.

Fig. 6.

Witnesses.
G. W. Gregory
L. H. Latimer

Inventor.
James Shackleton and Joseph P. Binns
per H. K. P. Joy
Attys.

J. SHACKLETON & J. P. BINNS
Machine for Tying in Warps.

No. 209,927. Patented Nov. 12, 1878.

J. SHACKLETON & J. P. BINNS
Machine for Tying in Warps.

No. 209,927. Patented Nov. 12, 1878.

UNITED STATES PATENT OFFICE.

JAMES SHACKLETON AND JOSEPH P. BINNS, OF HALIFAX, ASSIGNORS TO SAID BINNS, ABRAHAM AKEROYD, OF BRADFORD, ENGLAND, A. K. P. JOY, OF WINCHESTER, AND HENRY BINNS, OF LOWELL, MASS.

IMPROVEMENT IN MACHINES FOR TYING IN WARPS.

Specification forming part of Letters Patent No. 209,927, dated November 12, 1878; application filed January 15, 1876.

*To all whom it may concern:*

Be it known that we, JAMES SHACKLETON and JOSEPH PICKLES BINNS, of Halifax, in the county of York, England, have invented a new and useful Machine or Apparatus for Tying in Warps in the Manufacture of Cloth and Woven Fabrics; and do hereby declare that the following is a full and true description thereof, reference being had to the accompanying drawings.

This invention relates to a machine for uniting the threads of a new warp to the threads or ends of an old warp retained in the reed and heddles or harness removed from the loom to this machine, the new warps being tied to the old warps, in order that the old warps may properly lead the new warps through the heddles and reed, and when properly connected the heddles, reed, and new warp-beam are transferred to the loom prepared to weave the new warp.

This operation is called "tying in;" and the object of this invention is to perform this work automatically instead of by hand, as heretofore commonly done, the latter operation being a slow and tedious one.

The new and old warps are separated, each alternate one above and below "leash-rods," as usual. The old warp is preferably placed horizontally over the new warp and held taut, and in this position fingers separate an old and a new warp from the mass of warps. A needle engages the warps so separated. The old warp is cut between the beam and separating-fingers. The new warp is cut from the rod holding its outer end. The needle draws the warp-threads so cut up through warp-holders, slotted to receive the needle, and moved to clasp and hold the two ends of the warp drawn up through the slots and extended in the path of a looping-hook, that seizes the ends, winds them about the end of a loop-rest, having within it a crochet-hook, or equivalent hook, adapted to draw the ends through the loop of thread held on the loop or thread rest, and so as to form a fast knot, at which time the tied warps are discharged from the looper by a cast-off, and a knot-tightening lever draws the tied ends away from the tying devices, draws the knot taut, and places the tied warps on a receiver, where they are held.

This apparatus for operating on the warps in this way is mounted on a carriage, moved over the warps intermittingly at a speed according to the fineness of the warps; but instead of moving such mechanism, as herein described, the warps and beams might be moved laterally.

A mechanism is provided to stop the machine in case the warps break or are not correctly picked up by the needle prior to the tying operation.

Figure 4:
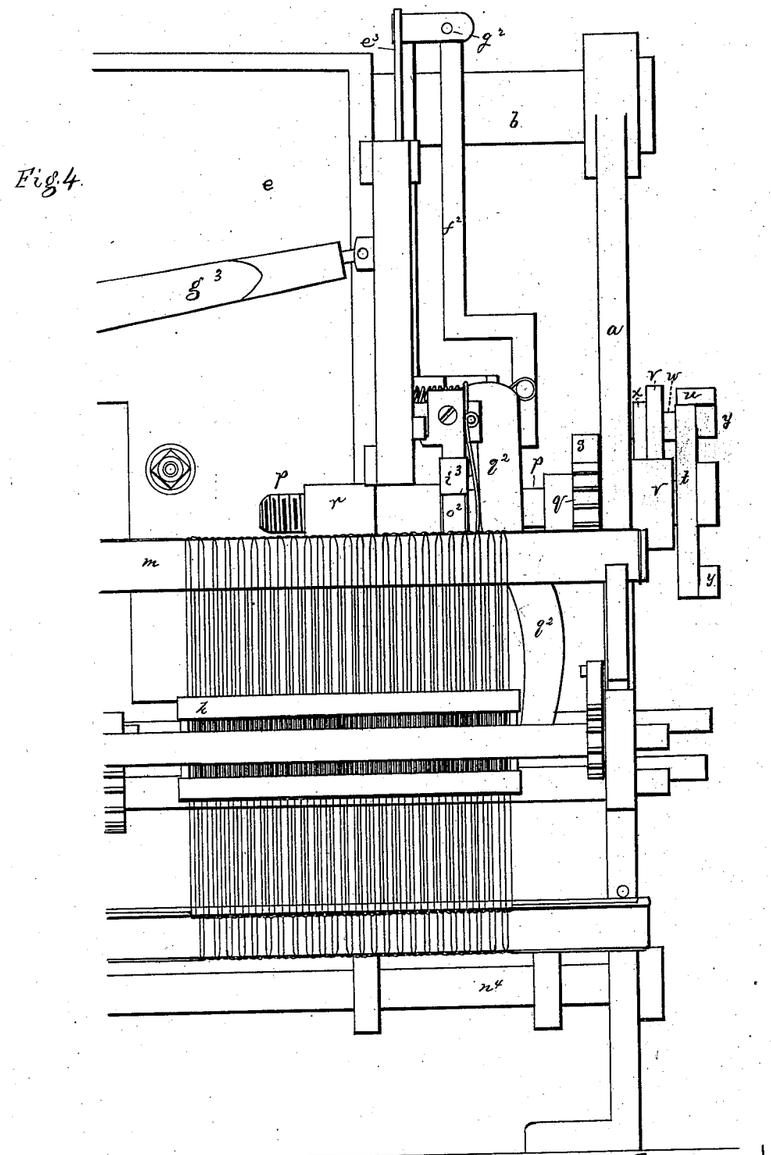

The frame-work $a$ of the machine is of any suitable construction to sustain the working parts; and extended from end to end are shafts $b\ c$, that guide a frame or carriage, $e$, on which is mounted the principal portion of the devices for separating, picking up, severing, and tying in or uniting the new and old warps. The new warp $f$ extends from the warp-beam $g$ to the fastening-beam $h$, the warps being split or divided by the hollow rods $i$, that act as leash-rods. The old warps, connected with a piece of woven fabric, $j$, extend through the reed $k$ and heddle-eyes $l$ of the harness-frames $m$, and pass also over and under the upper pair of hollow rods $i$, and they are then connected with the beam $n$, and the old and new warps pass also alternately over and under the warp-selecting fingers $o$, the fingers acting against the warps at or near the warp-crossings. A screw-shaft, $p$, (see Fig. 4,) supported in the end framing, and provided with a ratchet-pinion, $q$, enters a screw-threaded ear, $r$, on the carriage $e$, and the shaft $p$, intermittently rotated by the pawl $s$, mounted on an eccentric on the revolving shaft $c$, moves the carriage intermittingly to place the devices carried by it in position over the warps to properly select or pick up an old and a new warp in pairs. The wheel $q$ is provided with the proper number of teeth to adapt the movement of the carriage to the finest warp to be tied, and the carriage is arranged to have a movement entirely across the warps, to select the new and old warps in pairs from one to the other side of the warp in proper succession.

When operating on coarser warps this wheel $q$ and pawl $s$, adapted for fine warps, would not move the carriage far enough at each rotation of the shaft $c$; and to remedy this without change of wheels a second ratchet-wheel, $t$, is employed, it being actuated by a catch, $u$, on a lever, $v$, raised and lowered to move the catch by a crank-pin, $w$, on a disk, $x$, attached to the shaft $c$. The wheel $t$ has teeth; (see dotted lines, Fig. 7;) but the teeth are provided with buttons $y$, by means of which the teeth may be practically covered, and the end of the catch $u$, made broad, (see Fig. 4,) slides over the buttons, and does not engage the teeth.

Figures 7, 8, 9, 10, 11, 12, 13, 14:
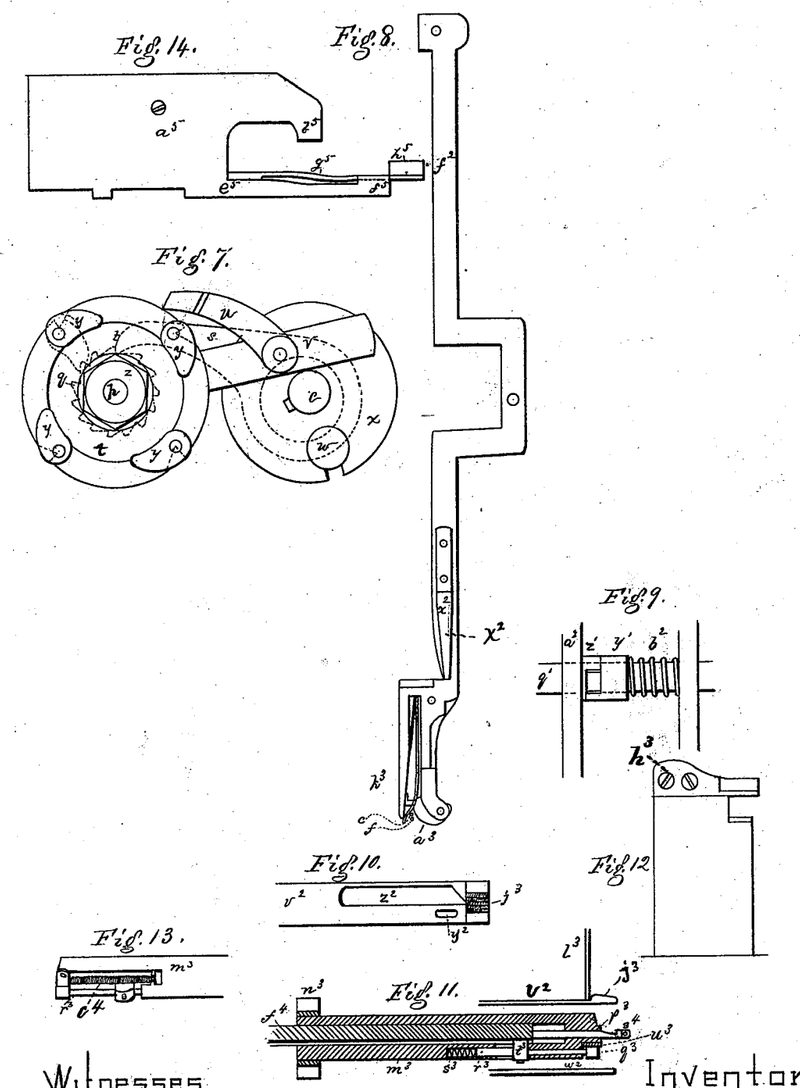
Fig. 7, a partial end view.
Fig. 8, a view of the needle detached.
Fig. 9, a detail view of one of the hubs and tappet-bosses to operate the comb-teeth.
Fig. 10, the slotted guide and holder through which the needle descends.
Fig. 11, a partial section through the knot-forming devices.
Fig. 12, one of the knives or cutting devices for the new warp, and shown as removed from its plate $l^4$.
Fig. 13 is a view of the sleeve $m^3$ on the side opposite from that shown in Fig. 1.
Fig. 14, a side view of the divided slide adapted to carry the warp-feelers.
Figure 19:
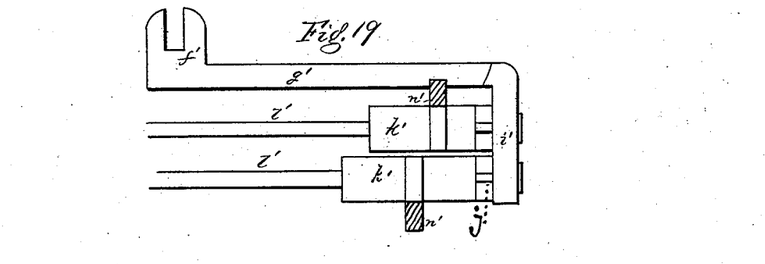
Fig. 19 is a detail of the slide for operating the rods of the fingers.

In Fig. 7 the buttons are all closed; but one or more of these buttons may be turned, as shown in dotted lines, to throw their smallest ends against the hub $z$, and then the teeth so uncovered will be engaged by the catch $u$. If but one tooth is uncovered, the catch $u$ can operate but once during each rotation of the screw-shaft $p$, the balance of the rotation of such shaft being produced by the pawl $s$, operated by the eccentric on shaft $c$, (see dotted lines, Fig. 7,) and when the catch $u$ operates it moves the shaft $p$ farther than would the pawl $s$, and this increased throw of the shaft and movement of the carriage may be gained by the wheel shown in Fig. 7 from one to four times during each rotation of the shaft $p$, accordingly as one or four teeth are engaged by the catch $u$, and such extra movement will move the carriage sufficiently fast for the coarsest warp. This wheel may be provided with any suitable number of teeth. On the shaft $c$, and between the lugs $a^1$ $a^1$ on the carriage, is placed an elongated cam hub or sleeve, $b^1$, provided with a number of cam-grooves, to operate as hereinafter described, and this cam-hub is keyed to and so as to rotate with and reciprocate on the shaft $c$. A cam-groove, $c^1$, (see dotted lines, Figs. 1 and 2,) engages a projection from an arm, $d^1$, (see dotted lines, Fig. 2,) pivoted at $e^1$, and connected at $f^1$ with a lug on a slide, $g^1$, adapted to move in guide-ways $h^1$; and the vertical part $i^1$ of the slide is provided with studs $j^1$, to receive the sleeve-like ends $k^1$, Fig. 19, of the hollow rods $l^1$, provided with selecting-fingers $o$. These rods are steadied by means of the rods or wires $m^1$, inserted within them from the outside of the frame after the warps are divided and in place, and each end $k^1$ has an arm, $n^1$, projecting therefrom. The arms of the rods in the same vertical plane project laterally in the same direction, and are connected by springs $o^1$, and each arm is acted on by a cam, $p^1$, on one of the shafts $q^1$, mounted on the frame $a$, and moved from the pinions 1 2 on shaft $c$, pinions 1 2 engaging pinions 3 and 4 on the upper shaft, $q^1$, of each pair of shafts, the hubs of these pinions 3 4 being provided with pinions 5 6 to engage pinions 7 8, provided with clutches 9 10, engaging corresponding clutch parts on the lower of each pair of shafts $q^1$, these clutches being provided in order to stop the rotation of the lower shafts in case two threads come together on one side the leash-rod.

Figure 5:
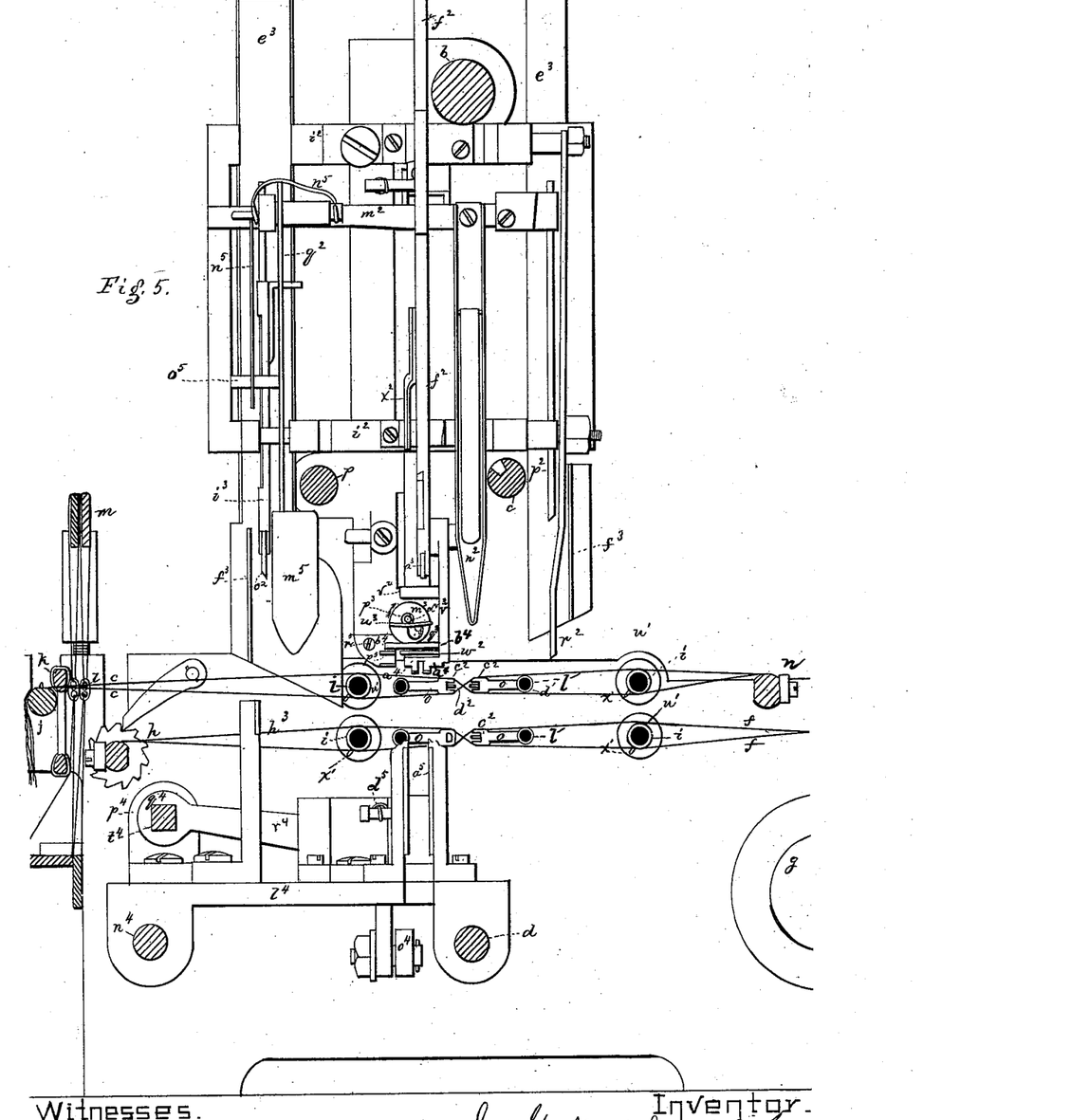
Fig. 5, a vertical section on line $x\,x$, Fig. 1.
Figure 6:
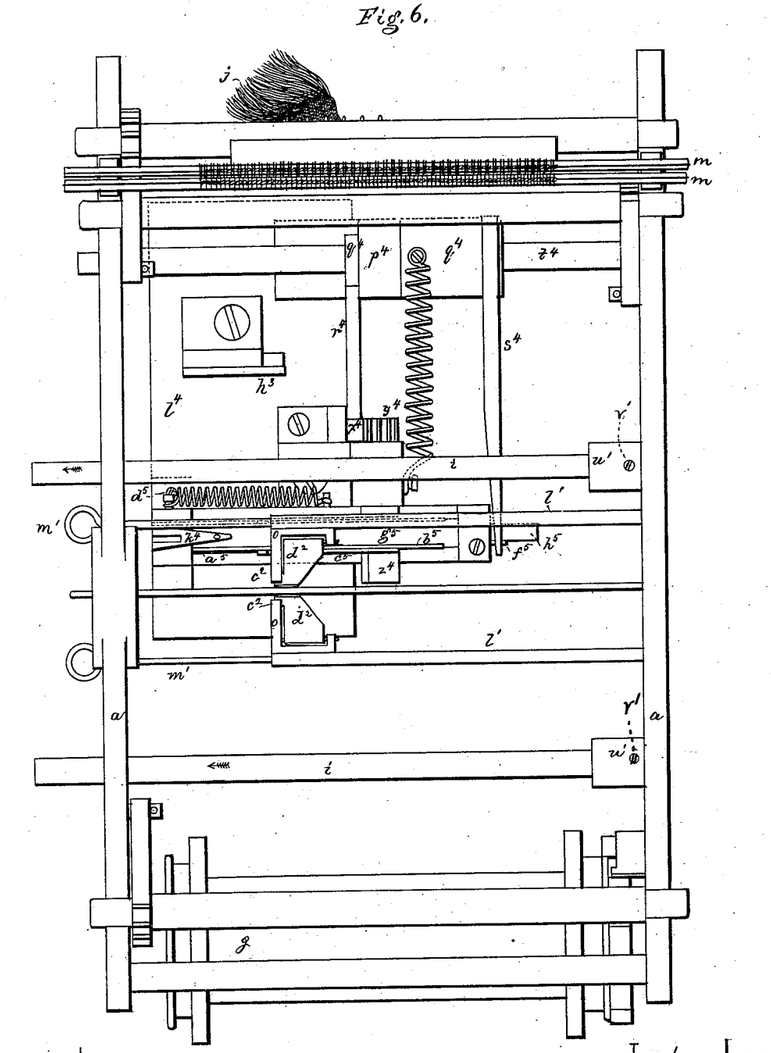
Fig. 6, a partial horizontal section of Fig. 1, the needle and carriage being removed.
Figure 16:
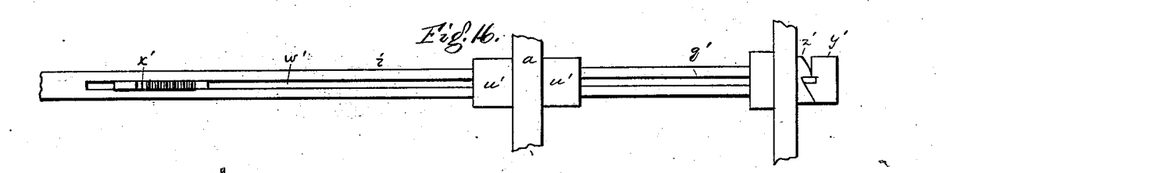

The pinions are moved to unclutch the clutch and stop the lower shafts through a shipper, $r^1$, operated by a handle, $s^1$, a spring, $t^1$, throwing the shipper back when the fault is corrected. These shafts $q^1$ are tubular or hollow, and each is provided at one side with a longitudinal slot, (see Fig. 16,) and the hollow shafts $i$, Figs. 5 and 6, are continuations of the shafts $q^1$, these shafts being connected through sleeves $u^1$; and, by removing screws $v^1$, Fig. 6, shafts $i$ may be withdrawn in the direction of the arrows, in order to insert them between the warps in the position of and to act as leash-rods.

Figure 15:
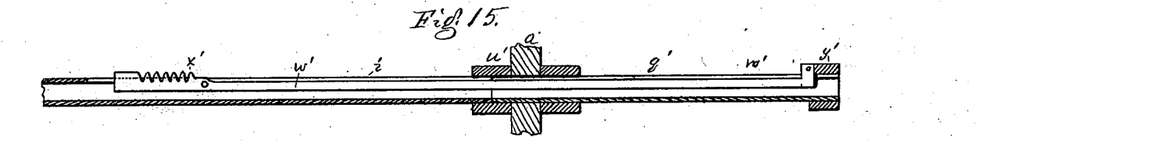
Figs. 15 and 16, views of the hollow rods and bars and combs in detail.

Within the hollow shafts $i$ $q^1$ are bars $w^1$, (see Figs. 15 and 16,) provided with comb-like teeth $x^1$. At the right-hand end of these bars $w^1$ are secured hubs $y^1$, (see Figs. 9 and 16,) provided with side cams or inclines, and adapted, as the shafts $q^1$ turn, to ride over tappet-bosses $z^1$, attached to the frame $a^2$, that moves with the carriage $e$. Each hub $y^1$ is acted on by a spring, $b^2$, one end of which also rests against frame $a^2$, and as the shafts $q^1$ are rotated the hubs are reciprocated through the action of the inclines and bosses, causing the comb-teeth $x^1$ to enter alternately between the warps above and below the hollow shafts $i$, to assist in separating some of the outside threads of the warps to be selected and tied from the mass of warps, they dividing the warps as leash-rods. These shafts $i$ $q^1$ rotate once to two revolutions of the shaft $c$, and the combs $x^1$ act alternately to separate threads passing above and below the shafts $i$. The cams $p^1$, for rocking the finger-carrying rods $l^1$, are adapted to move on the shafts $q^1$ with the frame $a^2$.

It is assumed that the carriage will start from the left and move over the warps toward the right. (See Figs. 1 and 6.)

The warp-fingers $o$ are rocked or turned to alternately engage the mass of warps above or below them, the fingers in the same horizontal plane, and acting upon the same set of warps, moving in opposite directions. The warps of each set are crossed between the fingers, as shown at Fig. 5. The ends $c^2$ of the fingers $o$ are arranged to be moved above and below the level of the warp-threads between which they are placed, and in either of their positions will hold and prevent the lateral movement, and consequent separation, of the warps resting directly against them from the adjacent untied warps.

Having in mind that the crossed warps between the fingers arrive at the crossing-point alternately from above and from below the fingers, it will be obvious that the extreme outer thread at such crossing holds the next thread to it from lateral motion. When the extreme outer thread is released by one finger, the adjacent thread is held by the opposite finger, and such thread, acting on a third thread back from the point of crossing, it extending over the finger which has just released a thread, holds in place all the threads above and below such finger. In this way but one old and one new warp can escape at one time.

The wings $d^2$, forming part of the fingers, retain in a horizontal plane the warps not acted upon by the ends $c^2$, and all the warps immediately at the right of the elevated or depressed parts $c^2$ are, by the movement of the fingers and slide $g^1$ to the right, drawn away from the two warps released to be tied, one thread from the old and one from the new set of warps.

Prior to releasing the two warps to be tied from the adjacent warps, the comb-teeth $x^1$, in their rotation with the shaft $i$ $q^1$, are projected among the outside threads and thrown to the left by the action of the springs $b^2$, thereby somewhat separating the warp-threads caught by them from the mass of warps, and holding them in a direct line from one to the other hollow shaft $i$, so as to be engaged and moved by the parts $c^2$ of the fingers, and as the fingers move to the right the comb-teeth are disengaged from the warps. The cam $k^2$ operates lever $l^2$, to depress the bar $h^2$ and warp-needle $f^2$, pivoted thereto at $g^2$.

The bar $h^2$ is guided in boxes in a frame, $i^2$, (see Fig. 5,) and has a cross-bar, $m^2$, to which is connected a wedge-shaped pushing-rod, $n^2$, knife $o^2$ for the new warp, and knife $p^2$ for the old warp, and a detaining-lever, $q^2$, and attached to the frame $i^2$ is a stationary knife, $r^2$, for the old warp.

The wedge-shaped pushing-rod $n^2$, as the needle descends, extends below the needle and enters between the body of the warp and the threads already selected by the fingers and combs $x^1$ to be cut and tied, and separates them still farther from the other warps, and brings them in the path of the needle.

The cam $s^2$, (see Fig. 1,) just before the needle descends, moves lever $t^2$, that engages a pin on a piece, $u^2$, having warp-holders $v^2$ $w^2$, provided with slots, as at $z^2$, Fig. 10, and throws such warp-holders a short distance to the left, so that the warp-needle in descending passes through such slots, a guide-finger, $x^2$, on the needle entering an opening, $y^2$, in $v^2$, and as the needle approaches its lowest position the holders are moved farther to the left, the finger $x^2$ in slot $y^2$ acting to move the needle forward, it turning on its pivot $g^2$, thereby moving the threads held by the needle yet farther from the main body of warps and bearing them against warp-feelers, hereinafter described.

The threads represented at $c$ $f$, Fig. 8, as dots, will, as the needle descends, act against the hinged stop-piece $a^3$, lifting it and wedging the threads between the stop-piece and spring $k^3$, where the threads are retained under sufficient pressure or friction to allow the threads to be carried up through the slots in the holders.

Figure 1:
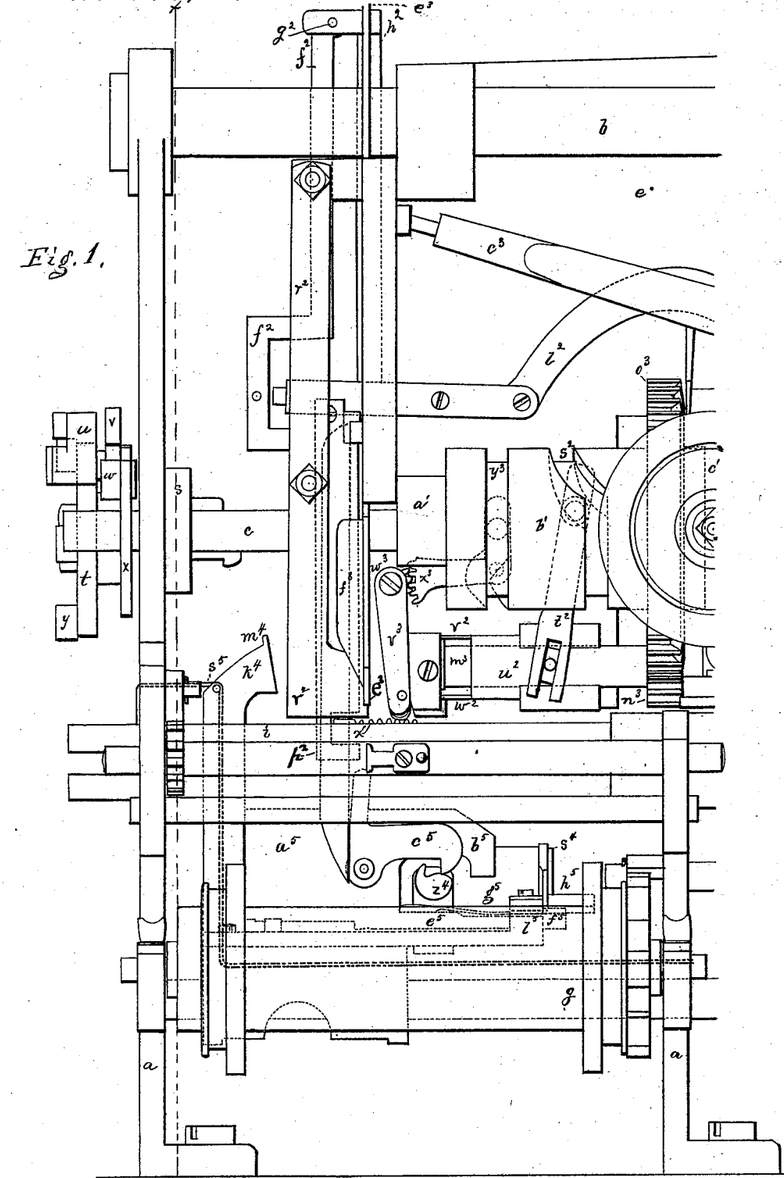
Figures 1 and 2 represent a front view of this improved machine.
Figure 2:
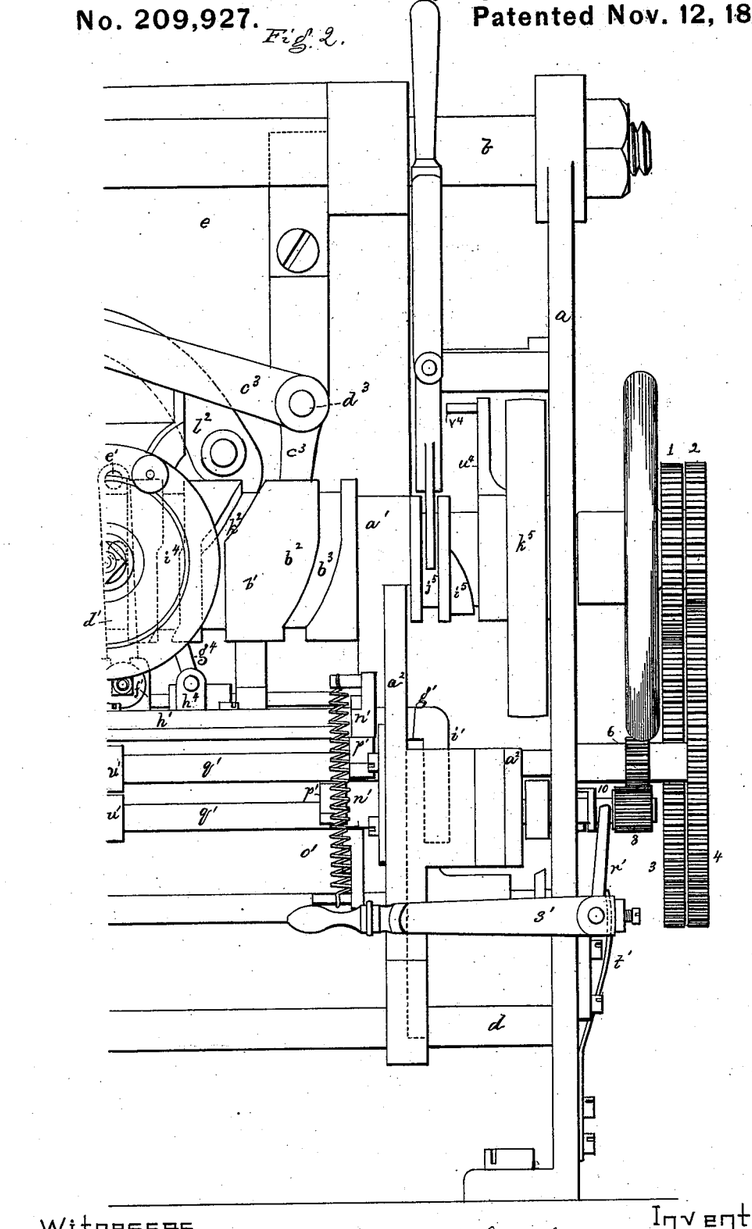

The cam $b^3$, (see Fig. 2,) just after of the descent of the warp-needle acted to move the lever $c^3$, mounted on the rock-shaft $d^3$, and connected with the warp-separating blade $e^3$, Fig. 5, provided with the inclined rib or feather $f^3$ and guided in the frame $i^2$, the opposite end of the rock-shaft $d^3$ (see Fig. 3) being provided with a second arm or lever, $g^3$, connected with a second like separating-blade, $e^3$, provided with a rib or feather, $f^3$; and these separating-blades descending just as the needle completes its forward motion, as above described, the ribs or feathers $f^3$, beveled as shown in Fig. 1, move the threads forward for the action of the knives. The cutting-edge of the knife $p^2$ for the old warp is produced by notching the blade of the knife, (see dotted lines, Fig. 1,) and the old warp resting on such edge is lifted by the knife and cut between the edge and the sharpened lower end of the stationary knife $r^2$, connected with frame $i^2$.

As the cross-bar $m^2$ rises to cut this old thread and lift the needle, the knife $o^2$ for the new warp is also raised, and it acts to lift the new warp and cut it against the edge of the fixed knife $h^3$. (See Fig. 12, showing this knife in detail.)

The movable shield $i^3$ on knife $o^2$ prevents the knife from cutting the old warp. After the threads are severed the needle ascends, drawing the ends up through the slits of the warp-holders $v^2$ $w^2$, and the needle then stops while the holders are drawn back to the right, taking with them the ends of the old and new warp just at, and while yet held by, the needle; and as the holder $v^2$ completes its backward movement the holding-pad $j^3$ (see Figs. 10 and 11) presses the threads between itself and the holding-spring $l^3$, (see Fig. 11,) holding the severed ends firmly for the tying-in operation. The threads in this condition extend from one guide or holder to the other across the end of the tying devices. (See Fig. 5.)

Figure 18:
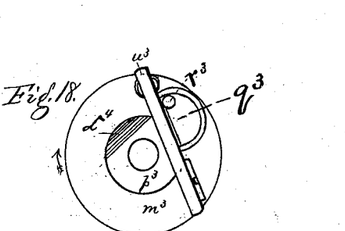
Fig. 18 shows the devices, in part, for tying the knot.

The tying devices consist of a rotary sleeve or shaft, $m^3$, Fig. 1, provided with a pinion, $n^3$, to engage and be operated by a toothed wheel, $o^3$, on the shaft $c$. This sleeve has at its forward end a thread-rest, $p^3$, Fig. 18, suitably shaped to receive and hold for the desired length of time the warp-threads looped about it, the warps extending between the holders and across the end of the sleeve, being caught below the center of the sleeve and thread-rest by a looper, $q^3$, provided with a notch or projection upon its outer face to catch the thread, the looper being secured at the end of a looper-rod, $r^3$, Fig. 11, pressed forward by a spring, $s^3$, and regulated as to its forward position beyond the sleeve by an adjustable collar, $t^3$. A cast-off lever, $u^3$, is pivoted at one end to the sleeve (see Figs. 5 and 18) between the thread-rest $p^3$ and looper $q^3$, and its free end is held by a spiral spring, $c^4$, Fig. 13.

Figure 17:
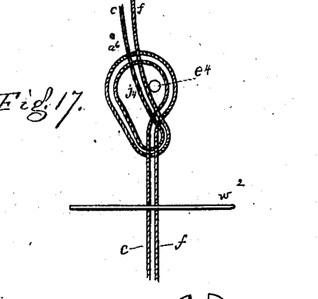
Fig. 17 represents the threads in the position they occupy when the ends are caught by the crochet or other hook or device for drawing such ends through the loop of thread to form a knot.

A knot-tightening lever, $v^3$, Fig. 1, pivoted at $w^3$, and having on its axle or shaft a toothed hub or sector, is engaged and moved by teeth on an elbow-lever, $x^3$, (see dotted lines, Fig. 1,) operated by the cam $y^3$. This tightening-lever $v^3$ has at its lower end a forked foot, $a^4$, Fig. 5, and a short distance above the foot is a pin, $b^4$, to operate the cast-off lever $u^3$. When the looper $q^3$ begins to act on the threads extending from one holder to the other, the cast-off $u^3$ and lever $v^3$ are in the positions shown in Fig. 5. The pressure of the thread on the cast-off $u^3$ pushes it back somewhat, permitting the looper to catch the thread properly, and as the looper revolves in the direction of the arrow, Figs. 5 and 18, it carries the thread about the thread-rest $p^3$ in the form of a loop or coil; and when the looper again reaches substantially its lowest position, the thread extending from the looper to the holding-pad $j^3$, being under considerable strain, is permitted, by reason of the beveled portion $d^4$ of the thread-rest $p^3$, to slip over or beyond the thread wound on and held by the rest and looper. This change of position of the outer end of the cut threads brings the ends $a^6$ of the warps (see Fig. 17) outside of the coil formed in the warps by the looper $q^3$ and rest, leaving the threads as shown in Fig. 17; and now the crochet or equivalent hook or device $e^4$ on the shaft $f^4$, located within the sleeve $m^3$ and rest $p^3$, and connected with the lever $g^4$, Fig. 2, by a friction-collar, $h^4$, Fig. 3, so that the shaft may rotate, with $m^3$. The crochet-hook, we repeat, operated by cam $i^4$, (see dotted lines, Fig. 2,) is drawn within the hub, catching the ends turned or drawn in front, as just described, at the point $j^4$, (see Fig. 17,) drawing such ends through the loop held on the rest $p^3$ and away from the holding-pad.

When the knot is tied the cast-off $u^3$ rests with its free end outside the pin $b^4$, and outward movement of the lever $v^3$ turns the cast-off $u^3$ and causes it to push the loop from the looper, and the further movement of lever $v^3$ causes the forked foot $a^4$ to complete the knot and draw the warps away from the holders and knot-forming devices, and the tied ends carried out by the forked foot are deposited on a cord, $s^5$, Fig. 1, on the receiver $k^4$, back of its point $m^4$, such point entering the notch in $a^4$ and taking the tied warps from the foot on the backward vibration of the lever.

Figure 3:
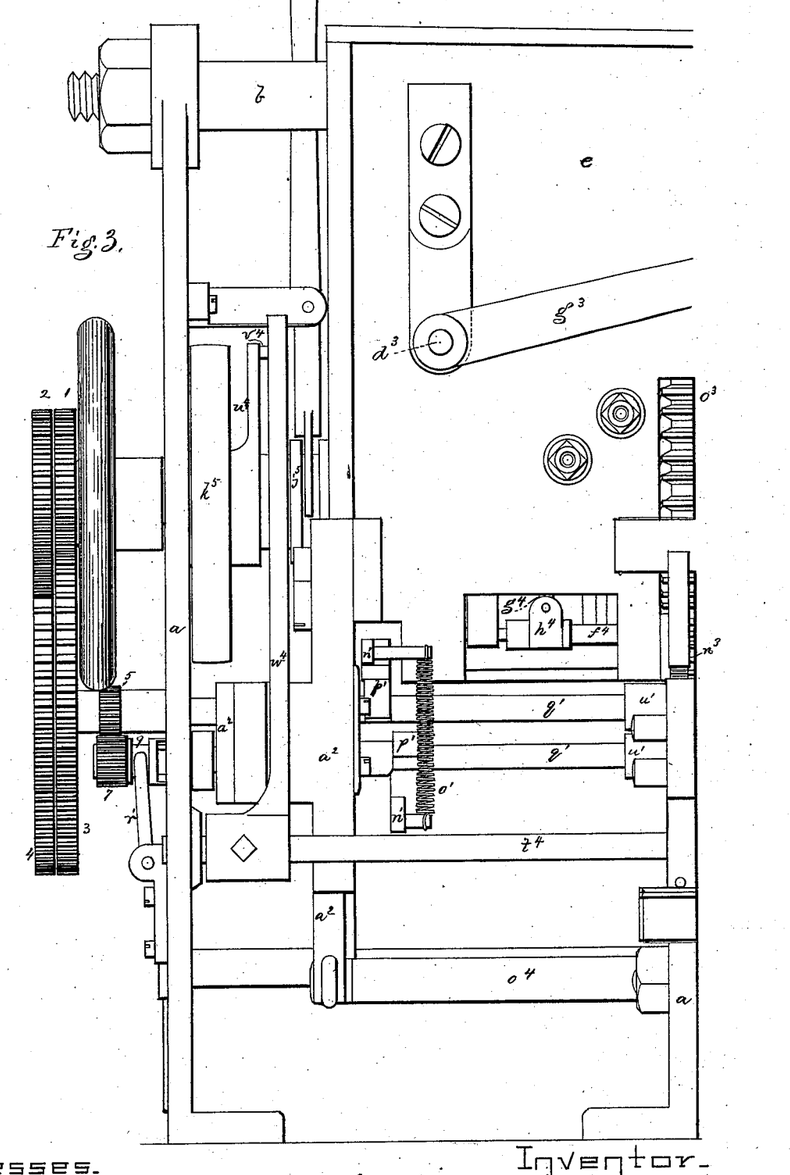
Figs. 3 and 4, a back view.

This receiver, $k^4$, is mounted on a sliding plate, $l^4$, Fig. 5, adapted to move on rods $d$ and $n^4$, and connected by a link, $o^4$, Fig. 3, with a projection depending from frame $a^2$, forming part of and moving with the carriage $e$, and in this way the tied warps are successively placed on the receiver. This sliding plate $l^4$ carries the stationary knife $h^3$, Fig. 5, for cutting the new warps, and also the device for stopping the machine when a thread or warp breaks or is not caught by the needle $f^2$. On the sliding plate is a bearing, $p^4$, for a sleeve, $q^4$, Fig. 6, provided with arms $r^4$ $s^4$, and within the sleeve is placed the shaft $t^4$, made square or of other irregular shape, to permit the sleeve to move over it and yet cause the shaft to rock the sleeve at each rotation of the main shaft $c$. An arm, $u^4$, Fig. 3, on a hub connected with shaft $c$, is provided with a pin, $v^4$, that at each revolution of the shaft $c$ meets the upper end of arm $w^4$, connected with shaft $t^4$, and rocks such shaft; and a toothed rack, $x^4$, (see Fig. 6,) on the end of arm $r^4$ engages a toothed wheel, $y^4$, and imparts a reciprocating motion to a toothed detecter-shaft, $z^4$, substantially as shown in Fig. 1. Plate $l^4$ also carries a divided slide, $a^5$, Fig. 14, having a hook at $b^5$, and provided with pivoted warp-feelers $c^5$, one for the old and one for the new warps, the upper end of each feeler being on a level with the line of warp with which it is to operate. A spiral spring, $d^5$, connected with the receiver $k^4$ and divided slide $a^5$, draws the slide to the left, (see Fig. 6,) and at the lower portion of the slide is an arm, $e^5$, (see Figs. 1 and 14,) provided with a shoulder, $f^5$; and connected with the arm $e^5$ is a spring, $g^5$, having a hook, $h^5$, and over this hook extends the arm $s^4$, connected with the rock-shaft $t^4$. The needle, when near its lowest position and holding the warps, is moved forward by the holders or guides, as before described, and in so doing passes between the plates of the divided slide and presses the old and new warps held by the needle against the feelers or catches $c^5$, each thread pressing its own feeler and elevating its notched end above the hook of the shaft $z^4$, so that the shaft, in its rotation, cannot engage the catches. The arm $s^4$, during the regular operation of the parts, rests at each descent on the broad face of the hook $h^5$, and the end of lever $w^4$ is prevented from descending so far as to meet cam $i^5$ on a sliding clutch-sleeve, $j^5$, on shaft $c$, and adapted to engage or leave loose on the shaft the belt-pulley $k^5$, by which the machine will be driven by power.

If both warps are not moved by the needle against the feelers, the shaft $z^4$ will catch the notched end of the feeler not lifted by a warp and will draw it forward, and the arm $s^4$ will fall on the part $f^5$ below the level of $h^5$, and the end of $w^4$ will drop low enough to be struck by the cam $i^5$, and the clutch $j^5$ will be moved laterally and the machine will be stopped.

When the arm $s^4$ descended on $f^5$ it depressed the arm and released the shoulder of $f^5$ from the frame $l^5$, and the spiral spring $d^5$ drew back the slide $a^5$; but it did not draw it fully back, for the end of the arm $s^4$ was interposed between the frame $l^5$ and the shoulder of $h^5$; but as the arm $s^4$ is again raised the spring $d^5$ completes the backward movement of the divided slide $a^5$, and leaves the rest-piece $h^5$ in proper position to determine the lowermost position of arm $w^4$ for regular work.

The detaining lever or arm $q^2$, Fig 5, with its broad lower face $m^5$, and acted on by a spring, $n^5$, connected at the pivotal point of $q^2$, and bearing on a pin, $o^5$, prevents the threads tied and deposited on the receiver $k^4$ or its cord $s^5$, hereinafter described, from working back and coming in contact with the knives.

A supporting-plate, $p^5$, (see Fig. 5,) attached to the carriage by a screw, $r^5$, projects forward in a horizontal direction parallel with the guide $w^2$ to a point beyond the upper ends of the warp-feelers, and this supporting-plate prevents the severed ends of the warps from becoming entangled with the old warps as the warps are being tied or being removed after they are tied. The beams and bars holding the old and new warps stretched are provided with suitable holding catches or devices. A cord, $s^5$, connected with the frame $a$ at the left of Fig. 1, (see dotted lines,) and extended through an opening or slit in the top of the receiver $k^4$, and thence down under the plate $l^4$, and then to the right, where it is joined with the central fixed portion of the frame $a$, supports the tied warps above the rods $i$ as the receiver is moved with the carriage $e$.

We do not desire to limit ourselves to the exact construction of devices shown and described, as we may modify the construction of the fingers, or of the warp-needles, sleeve, and looper; and, instead of the looper and sleeve shown, we may employ any equivalent hook, shaped to operate in an equivalent manner—viz, to form a loop in the threads; and with the looper may be employed, instead of the crochet-needle, any equivalent device to draw the free ends of the warp through such loop to form a fast knot.

It will be noticed that the threads to be cut and tied are placed in different planes and are held in fixed position, and the cutting devices operate to cut each thread of each series in proper succession, the cutting devices moving over the warps at substantially right angles to the length of the threads, and in paths of motion parallel each with the other, and the knot-tying mechanism and needle work, in connection with the warps, in a path or direction also parallel with the movement of and between the cutting devices; and it is obvious, therefore, that each thread of each series will be cut at the same distance at the right or left of the knot-tying devices at the same time.

We do not confine our invention simply to the tying in of warps. With slight modifications it may be adapted to a variety of purposes where threads or yarns are twisted, looped, or tied, as in nettings, sashes, fringes, and other similar purposes.

We claim—

1. The combination of a carriage and a screw-shaft, and mechanism to impart to the shaft and carriage a regular motion, with devices adapted to impart an additional movement to such shaft and carriage to adapt the movement of the carriage to fine or coarse warps.

2. The separating-fingers and rods connected therewith, in combination with the reciprocating slide and devices adapted to rock the fingers, substantially as described.

3. In combination, a needle adapted to pick up warps in pairs, holders $v^2$ $w^2$, to hold the warps distended, and knot-tying devices adapted to tie a fast knot in the warps, substantially as described.

4. The separating-blades provided with ribs or feathers and mechanism for operating the same, in combination with knives or cutting devices to separate and cut the threads before they are tied, substantially as described.

5. The combination, with the carriage and warp-needle, of the sliding plate, the warp feelers or catches, and devices to operate the catches to stop the machine when a warp-thread breaks or is not caught by the needle, substantially as described.

6. The combination of the needle with the pivoted warp feelers or catches and a toothed shaft, adapted to engage the catch if not elevated by the warp held by the needle, substantially as described.

In testimony whereof we have signed our names to this specification in the presence of two subscribing witnesses.

JAMES SHACKLETON.
JOSEPH PICKLES BINNS.

Witnesses:
R. RICHARDSON,
WALTER SCOTT.